US010193831B2

(12) United States Patent
Peled et al.

(10) Patent No.: US 10,193,831 B2
(45) Date of Patent: Jan. 29, 2019

(54) DEVICE AND METHOD FOR PACKET PROCESSING WITH MEMORIES HAVING DIFFERENT LATENCIES

(71) Applicant: Marvell Israel (M.I.S.L) Ltd., Yokneam (IL)

(72) Inventors: Itay Peled, Hagor (IL); Dan Ilan, Herzelia (IL); Michael Weiner, Nes Ziona (IL); Einat Ophir, Tel Mond (IL); Moshe Anschel, Tel-Mond (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 125 days.

(21) Appl. No.: 14/603,565

(22) Filed: Jan. 23, 2015

(65) Prior Publication Data
US 2015/0215226 A1  Jul. 30, 2015

Related U.S. Application Data

(60) Provisional application No. 61/933,709, filed on Jan. 30, 2014, provisional application No. 62/030,885, filed on Jul. 30, 2014.

(51) Int. Cl.
*H04L 12/873* (2013.01)
*H04L 12/865* (2013.01)
*H04L 12/931* (2013.01)
*H04L 12/861* (2013.01)

(52) U.S. Cl.
CPC ........ *H04L 49/9063* (2013.01); *H04L 47/521* (2013.01); *H04L 47/6275* (2013.01); *H04L 49/40* (2013.01)

(58) Field of Classification Search
CPC ............ H04L 49/9063; H04L 47/6275; H04L 47/521; H04L 49/40
See application file for complete search history.

(56) References Cited

U.S. PATENT DOCUMENTS

| 5,682,513 A * | 10/1997 | Candelaria | G06F 11/2064 711/113 |
| 5,893,162 A * | 4/1999 | Lau | G06F 5/065 707/999.1 |
| 6,427,173 B1 * | 7/2002 | Boucher | G06F 5/10 709/230 |
| 6,725,241 B1 * | 4/2004 | Rodriguez | G06F 12/023 |
| 6,952,401 B1 * | 10/2005 | Kadambi | H04L 47/125 370/232 |

(Continued)

*Primary Examiner* — Alex Skripnikov
*Assistant Examiner* — Richard Schnell

(57) ABSTRACT

A packet processing system and method for processing data units are provided. A packet processing system includes a processor, first memory having a first latency, and second memory having a second latency that is higher than the first latency. A first portion of a queue for queuing data units utilized by the processor is disposed in the first memory, and a second portion of the queue is disposed in the second memory. A queue manager is configured to push new data units to the second portion of the queue and generate an indication linking a new data unit to an earlier-received data unit in the queue. The queue manager is configured to transfer one or more queued data units from the second portion of the queue to the first portion of the queue prior to popping the queued data unit from the queue, and to update the indication.

21 Claims, 7 Drawing Sheets

(56) References Cited

U.S. PATENT DOCUMENTS

| | | |
|---|---|---|
| 8,819,312 B2 | 8/2014 | Shumsky et al. |
| 2012/0079144 A1* | 3/2012 | Shumsky ................. G06F 5/16 |
| | | 710/57 |
| 2015/0186068 A1* | 7/2015 | Benisty ................ G06F 3/0673 |
| | | 711/154 |

* cited by examiner

US 10,193,831 B2

DEVICE AND METHOD FOR PACKET PROCESSING WITH MEMORIES HAVING DIFFERENT LATENCIES

CROSS-REFERENCE TO RELATED APPLICATIONS

This application claims priority to U.S. Provisional Patent Application No. 61/933,709, filed Jan. 30, 2014, entitled "Managing Extendable HW Queues," and to U.S. Provisional Patent Application No. 62/030,885, filed Jul. 30, 2014, entitled "Managing Extendable HW Queues," which are incorporated herein by reference in their entireties.

FIELD

The technology described herein relates generally to data communications and more particularly to systems and methods for managing a queue of a packet processing system.

BACKGROUND

In a typical packet processing system, packets originating from various source locations are received via one or more communication interfaces. Each packet contains routing information, such as a destination address and other information. The packet processing system reads the routing information of each received packet and forwards the packet to an appropriate communication interface for further transmission to its destination. At times, for instance because of packet data traffic patterns and volume, the packet processing system may need to store packets in a memory until the packets can be forwarded to their respective outgoing communication interfaces. Some memory space that is located in relative close proximity to a packet processing core of the packet processing system, is limited in size, is relatively low latency and is comparatively expensive. Conversely, other memory space that is located relatively far away from the packet processing core typically has the potential of being significantly larger than memory space that is located in close proximity to the packet processing system. However, while the other memory space is comparatively less expensive it also exhibits relatively high latency.

The description above is presented as a general overview of related art in this field and should not be construed as an admission that any of the information it contains constitutes prior art against the present patent application.

SUMMARY

Examples of a packet processing system and a method for processing data units are provided. An example packet processing system includes a processor, first memory having a first latency, and second memory, different from the first memory, having a second latency that is higher than the first latency. A first portion of a queue for queuing data units utilized by the processor is disposed in the first memory, and a second portion of the queue is disposed in the second memory. The example packet processing system also includes a queue manager configured to (i) selectively push new data units to the second portion of the queue and generate an indication linking a new data unit to an earlier-received data unit in the queue, and (ii) transfer, according to an order, one or more queued data units from the second portion of the queue disposed in the second memory to the first portion of the queue disposed in the first memory prior to popping the queued data unit from the queue, and to update the indication.

As another example, a method for processing data units includes defining a first portion of a queue for queuing data units utilized by a processor in a first memory having a first latency. A second portion of the queue is defined in a second memory having a second latency that is higher than the first latency. New data units are selectively pushed to the second portion of the queue. Linking indications are generated between data units of the queue, where one or more of the linking indications crosses the first memory and the second memory. The method also includes transferring, according to an order, one or more queued data units from the second portion of the queue disposed in the second memory to the first portion of the queue disposed in the first memory prior to popping the queued data unit from the queue. At least one of the linking indications is updated when a data unit is transferred from the second portion of the queue to the first portion of the queue.

DETAILED DESCRIPTION

Figure 1:
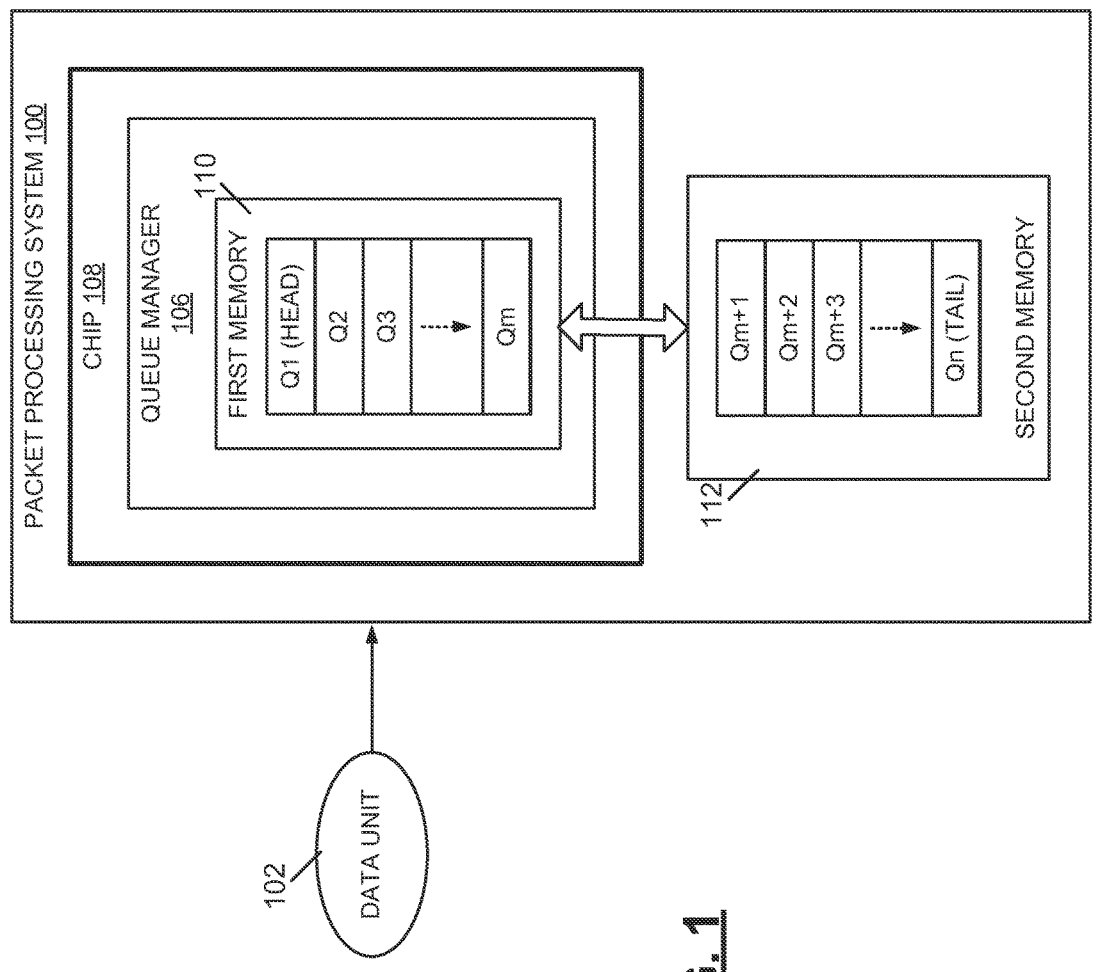
FIG. 1 is a block diagram depicting a packet processing system in accordance with an embodiment of the disclosure.

FIG. 1 is a simplified block diagram depicting a packet processing system 100 in accordance with an embodiment of the disclosure. In an example, the packet processing system 100 comprises at least a portion of a network device that is used in a packet-switching network to forward data packets from a source to a destination. The packet processing system 100 is generally a computer networking device that connects two or more computer systems, network segments, subnets, and so on. For example, the packet processing system 100 is a switch in one embodiment. The packet processing system 100 is not limited to a particular protocol layer or to a particular networking technology (e.g., Ethernet), and the packet processing system 100 may be a bridge, a router, or a VPN concentrator, among other devices.

The packet processing system 100 is configured, generally, to receive a data unit 102, such as an Ethernet packet, process the data unit 102, and then forward the data unit 102 to a final destination or another packet processing system. In an example, the data unit 102 is a data packet received at the packet processing system 100 via an input/output (IO) interface. The packet processing system 100 includes one or more processors for processing the data unit 102. In the example of FIG. 1, the one or more processors are implemented as one or more integrated circuits disposed at least on a first chip 108. It is noted that the one or more processors need not be disposed on a single chip. In some embodiments, different modules of a processor (e.g., different CPUs, northbridge portions, southbridge portions, I/Os, Serializer/Deserializer (SerDes), etc.) are spread across several different chips. Thus, in an example, a single processor (e.g., a single packet processor) in the packet processing system 100 is disposed on multiple, different chips, with the chips not limited to being a processor chip and a memory chip. For a processor including a central processing unit (CPU), northbridge portion, and southbridge portion, each of these components is disposed on a different respective chip, in an embodiment.

In the example of FIG. 1, the first chip 108 further includes a first memory 110 that allows the one or more processors to temporarily store the data unit 102 and other data units as those data units are processed. It is noted that the first memory 110 need not be disposed on a single chip. In some embodiments, the first memory 110 is distributed across multiple chips or dice. In an example, the first memory 110 is a relatively fast memory with comparatively low latency, high bandwidth, and a relatively small storage capacity. The first memory 110 comprises static random-access memory (SRAM), in an embodiment, or other suitable internal memory configurations. In an example, the first memory 110 is in relative close proximity to processor components of the one or more processors of the packet processing system 100. To compensate for the relatively small storage capacity of the first memory 110, the packet processing system 100 also includes a second memory 112. In an example, the second memory 112 is a relatively inexpensive memory with a comparatively slow speed, higher latency, and lower bandwidth, as compared to the first memory 110. The second memory 112 comprises dynamic random-access memory (DRAM), in an embodiment, or other suitable external memory configurations. A storage capacity of the second memory 112 typically is greater than that of the first memory 110. In an example, the second memory 112 is disposed farther away from the processor components of the one or more processors of the packet processing system 100, as compared to first memory 110.

In the example of FIG. 1, the second memory 112 is disposed on a second integrated circuit that is separate from and coupled to the first chip 108. In examples similar to that depicted in FIG. 1 (e.g., where the first memory 110 is disposed on at least the first chip 108, and the second memory 112 is not disposed on the first chip 108), the first memory 110 is referred to as "on-chip memory" or "internal memory," and the second memory 112 is referred to as "off-chip memory" or "external memory." It is noted that in some embodiments, the first and second memories 110, 112 are co-located on a same chip, package, or device. It is further noted that in certain examples, the second memory 112 is disposed on one or more chips that include processor components of the one or more processors. In other examples, the second memory 112 is disposed on one or more chips that do not include processor components of the one or more processors.

In some instances, the packet processing system 100 is unable to immediately forward data units to respective designated communication interfaces. In such instances, the data units are stored in the first memory 110 or the second memory 112 until the packet processing system 100 is able to perform the forwarding. In some embodiments, a packet is buffered while processing is performed on a descriptor that represents the packet. In some embodiments, after a descriptor is processed, the descriptor and/or the packet is buffered in an output queue until the packet is actually egressed from the packet processing system 100. It is noted that the first and second memories 110, 112 are used in various other contexts to store data units (i) prior to the processing of the data units, (ii) during the processing of the data units, and/or (iii) after the processing of the data units.

In an example, the first memory 110 and the second memory 112 store data units in a queue. The queue is used to queue data units utilized by the one or more processors. New data units are pushed (i.e., appended) to a "tail" of the queue, and data units are popped (i.e., removed) from a "head" of the queue. In an egress queue embodiment, the data units popped from the head of the queue are forwarded to their respective outgoing communication interfaces of the packet processing system 100. In some alternative examples of a transport queue, in which packets are queued during processing of descriptors, modified data units popped from the head of a queue are merged with a corresponding packet, or data from the data unit is merged with a buffered packet.

In the packet processing system of FIG. 1, a first portion of the queue is defined in the first memory 110, and a second portion of the queue is defined in the second memory 112. The single queue thus extends across both of the first and second memories 110, 112. In an embodiment, the low latency first memory 110 and the high latency second memory 112 are disposed on separate physical devices and/or are constructed using different microarchitectural design (e.g., the low latency first memory 110 comprises SRAM and the high latency second memory 112 comprises DRAM, in an embodiment). The extension of the queue across both of the first and second memories 110, 112 is illustrated in FIG. 1, which shows the first memory 110 including the first portion of the queue storing data units Q1 to Qm, and the second memory 112 including the second portion of the queue storing data units Qm+1 to Qn. In an embodiment, the first portion of the queue defined in the first memory 110 includes the head of the queue, and the second portion of the queue defined in the second memory 112 includes the tail of the queue. This is illustrated in FIG. 1, which shows the head of the queue (i.e., the data unit Q1) in the first memory 110 and the tail of the queue (i.e., the data unit Qn) in the second memory 112, In an example, the first portion of the queue stored in the first memory 110 is relatively small (e.g., with storage space for storing 1-4 data units in an embodiment). As noted above, data units are popped from the head of the queue defined in the first memory 110, and keeping the portion of the queue stored in the first memory 110 relatively small helps to prevent various quality of service problems (e.g., head of line locking) in the queue, in an embodiment. In an example, the second portion of the queue stored in the second memory 112 is relatively large and provides storage space for many data units of the queue.

The packet processing system 100 includes a queue manager 106 configured to manage the first and second portions of the queue defined in the first and second memories 110, 112, respectively. In an example, the queue manager 106 is configured to keep a state of the queue. Keeping the state of the queue includes, in an example, keeping track of a location of both the head and tail of the queue in the memories 110, 112, keeping track of a count of the total number of data units stored in the queue, and keeping track of a count of the number of data units stored in each of the first and second memories 110, 112, among other information. When new data units 102 are received at the packet processing system 100, the queue manager 106 is configured to selectively push the new data units 102 to the second portion of the queue defined in the second memory 112. The pushing of the new data units to the second portion of the queue is known as "enqueuing" and includes appending data units to the tail of the queue.

The queue manager 106 is said to "selectively" push the new data units 102 to the second memory 112 because, as described in further detail below, the queue changes over time and comes to be defined entirely in the first memory 110, in some embodiments. In such instances, with the tail of the queue being defined in the first memory 110, the new data units 102 are pushed to the first memory 110 rather than the second memory 112. In general, however, if the tail of the queue is defined in the second memory 112 (as depicted in FIG. 1), the queue manager 106 pushes the new data units 102 to the second portion of the queue defined in the second memory 112.

The queue manager 106 is also configured to transfer, according to an order, one or more queued data units from the second memory 112 to the first memory 110 prior to popping the queued data unit from the queue. Thus, data units are initially appended to the tail of the queue defined in the second memory 112, as described above, and are eventually migrated from the second memory 112 to the first memory 110 prior to be being popped from the queue. The popping of the queued data unit, also known as "dequeuing," is effectuated by the queue manager 106. In an embodiment where the queue is an egress queue, the popping of the queued data unit is effectuated by the queue manager 106 in response to a request from a packet scheduler. In other examples, the popping of the queued data unit is effectuated by the queue manager 106 in response to other requests or orders not originating from a packet scheduler. In an example, the migrating of data units from the second memory 112 to the first memory 110 causes the queue to be defined entirely in the first memory 110. In an example, although the queue at one point includes the portions defined in both the first and second memories 110, 112 (as depicted in FIG. 1), as queued data units are popped from the portion of the queue defined in the first memory 110, the data units of the queue stored in the second memory 112 are migrated to the first memory 110. In an embodiment, the migration of these data units eventually causes the queue to be defined entirely in the first memory 110. When additional non-queued data units are added to the queue, the queue again extends across both first and second memories 110, 112.

The use of queues that extend across both first and second memories 110, 112, as described herein, is useful, for instance, in periods of high-traffic activity, among others. Packet data traffic often has bursts of high activity, followed by lulls. Thus, the packet processing system 100 is characterized as having a sustained data rate and a burst data rate. The extension of the queue from the first memory 110 to the second memory 112 helps prevent overloading of the smaller first memory 110, which occurs when the bursts of high activity occur, in an example. In an example, during the bursts of high activity, data units are dropped by the packet processing system 100 if the first memory 110 becomes overloaded. By allowing data units to be placed on the portion of the queue defined in the second memory 112, the packet processing system 100 reduces the number of dropped data units and is able to cope with longer periods of high traffic.

The use of the queue that extends across both first and second memories 110, 112 also permits, for instance, a storage capacity of the first memory 110 to be kept to a relatively small size while facilitating large queues. In an example, in a conventional packet processing system that does not include the capability of forming a queue having portions in both first and second memories, it is necessary to increase the size of the first memory to buffer data at both the sustained data rate and the burst data rate. This is undesirable because the first memory 110 is a relatively expensive memory, among other reasons (e.g., a higher-capacity first memory 110 consumes more power on the first chip 108 and has a larger die size). Extending the queue from the first memory 110 to the second memory 112 obviates the need for increasing the storage capacity of the first memory 110, in some examples. Thus, the bifurcated queue architecture described herein also potentially reduces costs by enabling expanded use of the relatively inexpensive second memory 112 (e.g., comprising DRAM in an embodiment) for long queues, without negatively impacting performance offered by the first memory 110 (e.g., comprising SRAM in an embodiment). Additionally, keeping the storage capacity of the first memory 110 at the relatively small size helps to keep power consumption low in the first chip 108 and keep a die size of the first memory 110 low on the first chip 108.

Although the block diagram of FIG. 1 illustrates the queue manager 106 as being included on at least the first chip 108, in other examples, the queue manager 106 is not disposed on the first chip 108. Further, although the example of FIG. 1 depicts the first memory 110 as comprising a portion of the queue manager 106, in other examples, the first memory 110 is located on the first chip 108 but is not part of the queue manager 106. In an embodiment, the queue manager 106 is implemented entirely in hardware elements and does not utilize software intervention. In other examples, the queue manager 106 is implemented via a combination of hardware and software, or entirely in software.

Figure 2:
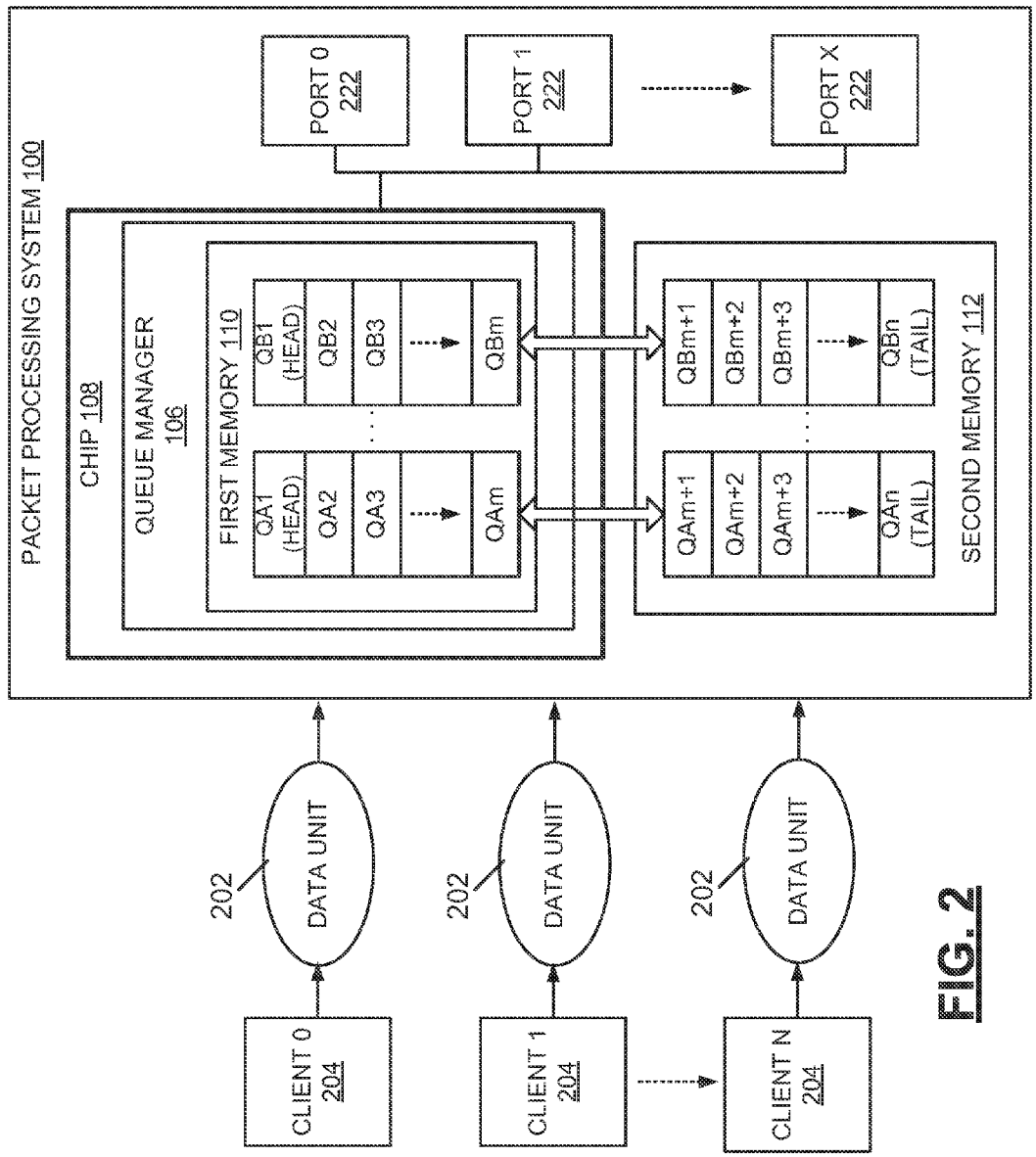
FIG. 2 is a block diagram depicting additional elements of the packet processing system of FIG. 1, in accordance with an embodiment of the disclosure.

FIG. 2 is a simplified block diagram depicting additional elements of the packet processing system 100 of FIG. 1, in accordance with an embodiment of the disclosure. As shown in FIG. 2, the packet processing system 100 includes a plurality of network ports 222 coupled to the first chip 108, and each of the network ports 222 is coupled via a respective communication link to a communication network and/or to another suitable network device within a communication network. Data units 202 are received by the packet processing system 100 via the network ports 222. Processing of the data units 202 received by the packet processing system 100 is performed by one or more processors (e.g., one or more packet processors, one or more packet processing elements (PPEs), etc.) disposed on the first chip 108. The one or more processors can be implemented using any suitable architecture, such as an architecture of application specific integrated circuit (ASIC) pipeline processing engines, an architecture of programmable processing engines in a pipeline, an architecture of multiplicity of run-to-completion processors, and the like. In an example, the packet processing system 100 receives a data unit 202 transmitted in a network via an ingress port of the ports 222, and a processor of the one or more processors processes the data unit 202. The processor processing the data unit 202 determines, for example, an egress port of the ports 222 via which the data unit 202 is to be transmitted.

In operation, the packet processing system 100 processes one or more data flows (e.g., one or more packet streams) that traverse the packet processing system 100. In an embodiment, a data flow corresponds to a sequence of data units received by the packet processing system 100 via a particular originating device or network. In FIG. 2, such originating devices or networks are depicted as Clients 0-N 204. The Clients 0-N 204 are sources of the data flows that utilize the queuing services of the queue manager 106 and may include, for example, Ethernet MACs, packet processors, security accelerators, host CPUs, ingress queues, and egress queues, among other networks, devices, and components. In some embodiments, a data flow is associated with one or more parameters, such as a priority level relative to other data flows. In an embodiment, the priority level of a data flow is based on a sensitivity to latency of the data flow or a bandwidth of the data flow, among other factors. Typically, an order of data units in a data flow is maintained through the packet processing system 100 such that the order in which the data units are transmitted from the packet processing system 100 is the same as the order in which the data units were received by the packet processing system 100, thus implementing a first-in-first-out (FIFO) system.

To maintain the order of data units within respective data flows, the packet processing system 100 utilizes a plurality of queues, in an embodiment. In an example, each queue of the plurality of queues is associated with a group of data units that belong to a same data flow. Thus, in an example, each queue of the plurality of queues is associated with a particular client of the Clients 0-N 204 from which the data flow originated. In an embodiment, the queue manager 106 queues the data units 202 in queues corresponding to respective data flows associated with the data units 202 and according to an order in which the data units 202 were received by the packet processing system 100. In an embodiment, the plurality of queues are implemented using respective linked lists. In this embodiment, each queue links a group of data units via a sequence of entries, in which each entry contains a pointer, or other suitable reference, to a next entry in the queue. In an example, in the linked list of data units, each data unit identifies at least a subsequent data unit in the linked list and an address for the subsequent data unit in one of the first memory 110 or the second memory 112. In other embodiments, the queues are implemented in other suitable manners that do not utilize a linked list.

Although the example of FIG. 2 depicts two queues, it is noted that the packet processing system 100 utilizes a smaller or larger number of queues in other examples. As shown in FIG. 2, a first portion of each queue is defined in the first memory 110, and a second portion of each queue is defined in the second memory 112. The first portions of the queues defined in the first memory 110 include the respective heads of the queues, and the second portions of the queues defined in the second memory 112 include the respective tails of the queues. When a new data unit 202 is received at the packet processing device 100, the queue manager 106 is configured to selectively push the new data unit 202 to the second portion of a respective queue defined in the second memory 112.

The queue manager 106 is further configured to transfer, according to an order, one or more queued data units from the second memory 112 to the first memory 110 prior to popping the queued data unit from a respective queue. In an example, the transferring of the one or more queued data units includes (i) physically migrating data stored in the second memory 112 to the first memory 110, and (ii) updating one or more pointers that point to the migrated data units. For example, as explained above, a queue is implemented using a linked list in an example, where each entry in the queue contains a pointer or other suitable reference to a next entry in the queue. In such instances where the queue is implemented using the linked list, the transferring of a queued data unit from the second memory 112 to the first memory 110 includes updating a pointer that points to the migrated data unit.

In an example, for each queue, the queue manager 106 monitors a number of data units of the queue that are stored in the first memory 110. Based on a determination that the number of data units is less than a threshold value, the queue manager 106 transfers one or more data units of the queue from the second memory 112 to the first memory 110. Thus, as a queued data unit stored in the second memory 112 propagates through the queue and approaches a head of the queue, the queued data unit is migrated to the part of the queue that is defined in the first memory 110. In an example, the transferring of data units from the second memory 112 to the first memory 110 is terminated when the number of data units of the queue stored in the first memory 110 is equal to the threshold value. In an example, the data units are read from the second memory 112 and written to the first memory 110 using a direct memory access (DMA) technique (e.g., using a DMA controller of the first memory 110).

Figure 3:
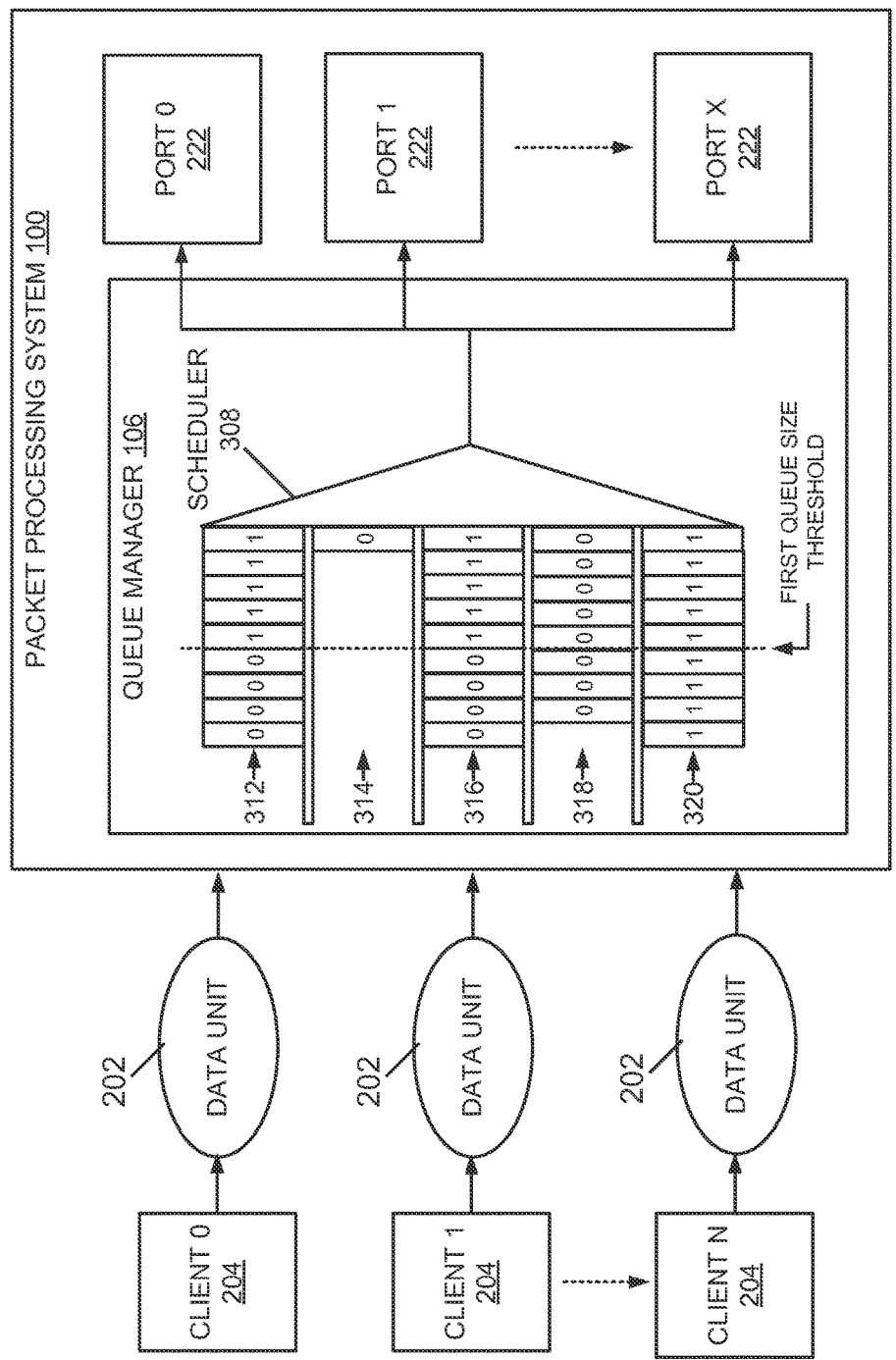
FIG. 3 is a simplified block diagram illustrating features of the queue manager depicted in FIGS. 1 and 2, in accordance with an embodiment of the disclosure.

FIG. 3 is a simplified block diagram illustrating features of the queue manager 106 depicted in FIGS. 1 and 2, in accordance with an embodiment of the disclosure. In the example of FIG. 3, the queue manager 106 is configured to manage a plurality of queues 312, 314, 316, 318, 320 of the packet processing system 100. Each of the queues 312, 314, 316, 318, 320 comprises one or more data units, with data units illustrated as being located closer to a scheduler 308 being closer to a head of a respective queue, and with data units illustrated as being farther from the scheduler 308 being closer to a tail of a respective queue.

In FIG. 3, data, units labeled "1" are stored in a first memory (e.g. the first memory 110 illustrated in FIGs. 1 and 2) of the packet processing system 100, and data units labeled "0" are stored in a second memory (e.g., the second memory 112 illustrated in FIGS. 1 and 2) of the packet processing system 100. As shown in the figure, the queues 312, 314, 316, 318, 320 can be defined (i) entirely within the first memory 110 (i.e., as shown in queue 320), (ii) entirely in the second memory 112 (i.e., as shown in queues 314, 318), or (iii) in both the first and second memories 110, 112 (i.e., as shown in queues 312, 316), Although the first and second memories 110, 112 are not depicted in FIG. 3, this figure illustrates data units of the queues 312, 314, 316. 318, 320 that are stored in the first and second memories 110, 11.2 (i.e., data units labeled "1" are stored in the first memory 110, and data units labeled "0" are stored in the second memory 112. as noted above). In an example, each of the queues 312, 314, 316, 318, 320 is associated with a data flow originating from a particular client of the Clients 0-N 204.

Different methods employed by the queue manager 106 in managing the queues 312, 314, 316, 318, 320 are discussed below. Specifically, the following discussion describes algorithms used by the queue manager 106 when a non-queued data unit 202 is to be added to one of the queues among queues 312, 314, 316, 318, 320. It is noted that a first step performed by the queue manager 106 in any of the algorithms described below is determining, for the queue to which the non-queued data unit 202 is to be added, if the tail of the queue is defined in the first memory 110 or the second memory 112. If the tail of the queue is defined in the second memory 112, the non-queued data unit 202 is automatically appended to the tail of the queue in the second memory 112. Conversely, if the tail of the queue is defined in the first memory 110, the algorithms described below are employed by the queue manager 106 in determining whether to add the non-queued data unit 202 to the queue in the first memory 110 or the second memory 112. Thus, the algorithms described below are relevant in situations where the non-queued data unit 202 is to be added to a queue having a tail defined in the first memory 110.

In an embodiment, one or more of the queues 312, 314, 316, 318, 320 are managed by the queue manager 106 based on a queue size threshold. In an example, the queue size threshold defines a maximum number of data units for a respective queue that are permitted to be stored on the first memory 110 of the packet processing system 100. When a non-queued data unit 202 is to be added to a particular queue, the queue manager 106 determines a number of data units of the particular queue that are currently stored in the first memory 110, If the number of data units is greater than or equal to the queue size threshold (e.g., the maximum number of data units for the particular queue that are permitted to be stored on the first memory 110, in an embodiment), the queue manager 106 adds the non-queued data unit 202 to the particular queue in the second memory 112. If the number of data units is less than the queue size threshold, the queue manager 106 adds the non-queued data unit 202 to the particular queue in the first memory 110.

The queues 312, 316 of FIG. 3 are managed by the queue manager 106 based on a queue size threshold. In the example of FIG. 3, the queue size threshold is equal to five data units. Thus, for each of the queues 312, 316, the queue manager 106 has stored five data units in the first memory 110, and additional data units of the queues 312, 316 are stored in the second memory 112. Although the example of FIG. 3 utilizes a queue size threshold that is the same for the queues 312, 316, it is noted that in other examples, each queue is associated with its own queue size threshold, and queue size thresholds vary between different queues.

In an example, the queue manager 106 transfers queued data units from the second memory 112 to the first memory 110 when a number of data units of a queue stored in the first memory 110 is less than the queue size threshold, where the queue size threshold defines the maximum number of data units for a respective queue that are permitted to be stored on the first memory 110. Thus, for example, for each of the queues 312, 316, the queue manager 106 monitors a number of data units of the queue that are stored in the first memory 110. Based on a determination that the number of data units is less than the queue size threshold (e.g., five data units in the example above), the queue manager 106 transfers one or more data units of the queue from the second memory 112 to the first memory 110. The transferring of data units from the second memory 112 to the first memory 110 is terminated, in an embodiment, when the number of data units in the queue stored in the first memory 110 is equal to the queue size threshold.

Extending queues from the first memory 110 to the second memory 112 based on the queue size threshold being met or exceeded helps avoid, in an embodiment, dropping of data units in the packet processing system 100. For example, in a conventional packet processing system that does not include the capability to form a queue having portions in both first and second memories, data units intended for a particular queue are dropped if the particular queue has a number of data units stored in first memory that meets or exceeds a certain threshold. In this scenario, the data unit is dropped because there is no room for it in the first memory. By contrast, in the packet processing system 100 described herein, the queue is selectably extended to the second memory 112, enabling nearly unlimited expansion of queue size. As noted above, the second memory 112 is generally a relatively inexpensive memory with a large storage capacity, and these properties of the second memory 112 are leveraged, in an embodiment, in extending the queue to the nearly unlimited size.

In an embodiment, a non-queued data unit 202 is added to a queue in the first memory 110 despite the fact that the queue size threshold for the queue is exceeded. In this embodiment, space for the non-queued data unit 202 is allocated in the first memory 110 on an as-available basis, taking into consideration the overall storage capacity of the first memory 110.

In an example, a queue size threshold for a particular queue is based on a priority of the particular queue. Each of the queues 312, 314, 316, 318, 320 is associated with a particular data flow originating from a certain client of the Clients 0-N 204, and the particular data flow is associated with one or more parameters, such as a priority level relative to other data flows, in an embodiment. In an example, the priority level of the particular data flow is based on a sensitivity to latency of the data flow and/or a bandwidth of the data flow, among other factors. Thus, in an example, a "high" priority data flow has a high sensitivity to latency and/or a high bandwidth, and a "low" priority data flow has a low sensitivity to latency and/or a low bandwidth. In an example, the priority of a queue is based on the priority level of the particular data flow with which the queue is associated. In an example, a high priority queue has a relatively high queue size threshold, thus allowing a larger number of data units of the queue to be stored in the first memory 110. Conversely, in an example, a low priority queue has a relatively low queue size threshold, thus allowing a smaller number of data units of the queue to be stored in the first memory 110. In other examples, priorities of the queues 312, 314, 316, 318, 320 are not considered in setting the queue size thresholds of the queues 312, 314, 316, 318, 320.

In another example, one or more of the queues 312, 314, 316, 318, 320 are managed by the queue manager 106 based on priorities of the respective queues. As explained above, a priority of a queue is, in an embodiment, based on a priority level of a particular data flow with which the queue is associated, with the priority level of the particular data flow being based on one or more factors (e.g., a sensitivity to latency of the data flow and/or a bandwidth of the data flow). When a non-queued data unit 202 is to be added to one of the queues among queues 312, 314, 316, 318, 320, the queue manager 106 determines a priority of the particular queue. If the particular queue is determined to have a low priority, the queue manager 106 adds the non-queued data unit 202 to the particular queue in the second memory 112. In this embodiment, the non-queued data unit 202 is added to the second memory 112 without considering a queue size threshold.

If the particular queue is instead determined to have a high priority, the queue manager 106 adds the non-queued data unit 202 to the particular queue in the first memory 110. In this embodiment, the non-queued data unit 202 is added to the first memory 110 without considering the queue size threshold. In an example, a queue determined to have the low priority is defined entirely in the second memory 112, and a queue determined to have the high priority is defined entirely in the first memory 110. Additionally, in an embodiment, if the particular queue is determined to have neither the low priority nor the high priority, the queue is determined to have a "normal" priority and is consequently managed by the queue manager 106 based on a queue size threshold (as discussed above) or based on another metric or algorithm.

The queues 314, 318, 320 are managed by the queue manager 106 based on priorities of the queues. Queue 320 is determined by the queue manager 106 to be a high priority queue, and consequently, the queue manager 106 places all data units for the queue 320 in the first memory 110. By contrast, queues 314, 318 are determined by the queue manager 106 to be low priority queues, and consequently, the queue manager 106 places all data units for the queues 314, 318 in the second memory 112. In order to pop data units from the queues 314, 318, data units from these queues 314, 318 are migrated from the second memory 112 to the first memory 110. The queue manager 106 effectuates popping of queued, data units from the first memory 110 in response to a request from the packet scheduler 308, and queued data units are not popped from the second memory 112. Thus, in order to be eligible for scheduling by the packet scheduler 308, data units of the queues 314, 318 must be transferred from the second memory 112 to the first memory 110. Data units popped from the queues 3.12, 314, 316, 318, 320 are forwarded to egress ports of the network ports 222.

Figure 4:
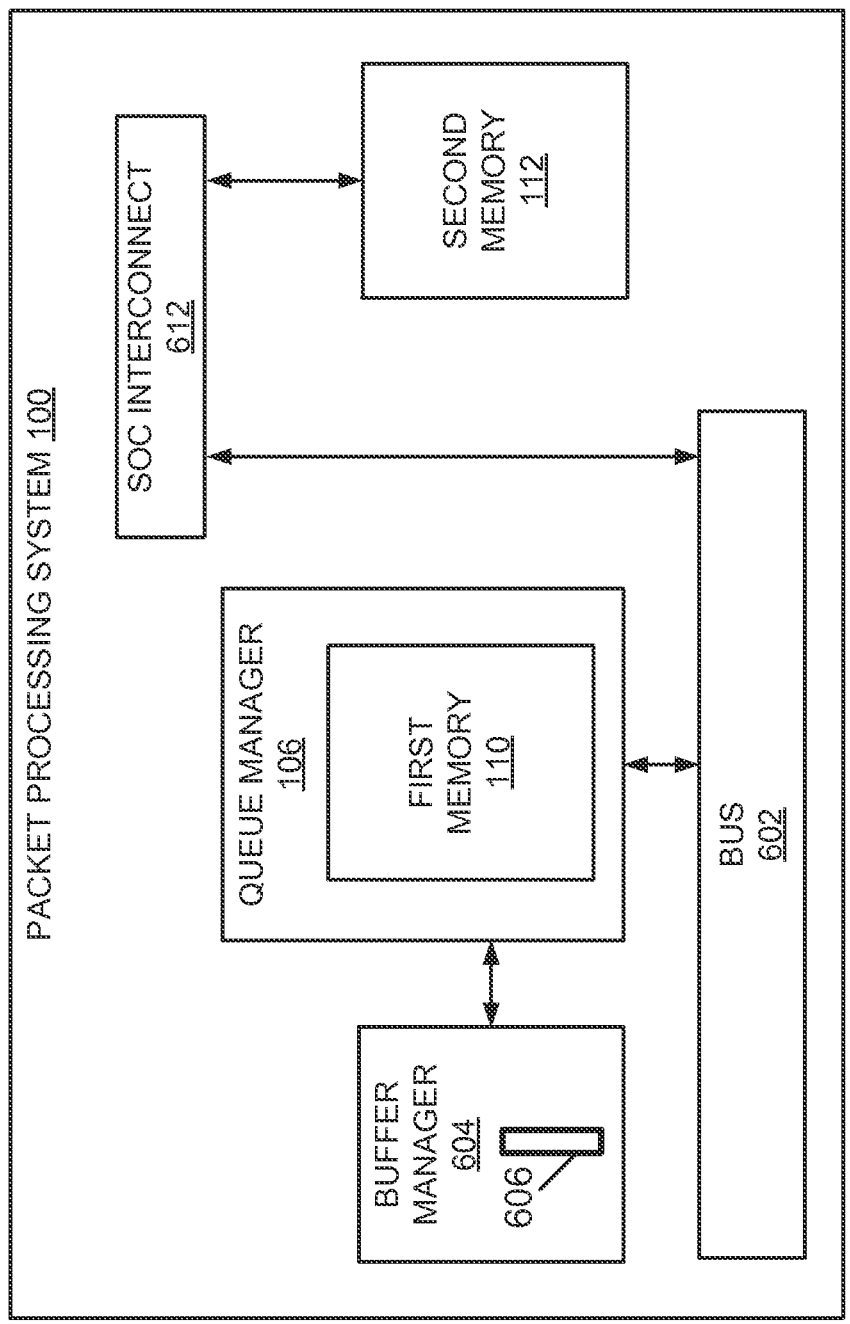
FIG. 4 is a simplified block diagram depicting additional components of the packet processing system of FIGS. 1-3, in accordance with an embodiment of the disclosure.

FIG. 4 is a simplified block diagram depicting additional components of the packet processing system 100 of FIGS. 1-3. In FIG. 4, the packet, processing system 100 is illustrated as including the queue manager 106, first memory 110, and second memory 112, which are described above with reference to FIGS. 1-3. The packet processing system 100 further includes a bus 602, buffer manager 604, and system-on-a-chip (SOC) interconnect 612. When a non-queued data unit is received at the packet processing system 100, the queue manager 106 generates a request to allocate storage space in one of the first memory 110 or the second memory 112 for the non-queued data unit.

The buffer manager 604 is configured to (i) receive the request from the queue manager 106, and (ii) allocate the requested storage space in the first memory 110 or the second memory 112 based on the request. A buffer element 606 in the buffer manager 604 is a pointer that points to the allocated storage space in the first memory 110 or the second memory 112. The queue manager 106 writes the non-queued data unit to the address specified by the buffer element 606 in the first memory 110 or the second memory 112. In writing the non-queued data unit to the second memory 112, the queue manager 106 utilizes the bus 602 of the packet processing system 100. Specifically, the queue manager 106 passes the non-queued data unit to the SOC interconnect 612 via the bus 602, and the SOC interconnect 612 passes the non-queued data unit to the second memory 112. In an example, the writing of the data unit from the queue manager 106 to the second memory 112 utilizes a DMA technique (e.g., using a DMA controller of the queue manager 106). The queue manager 106 later fetches the data unit from the first memory 110 or the second memory 112 prior to popping the data unit from the queue. The popping of the data unit from the queue, which is performed in response to a scheduling operation initiated by the packet scheduler 308 in an embodiment, uses information stored in the data unit such as packet length and payload pointer. The fetching of the data unit from the first memory 110 or the second memory 112 to the queue manager 106 enables this information to be used in the popping.

Figure 5:
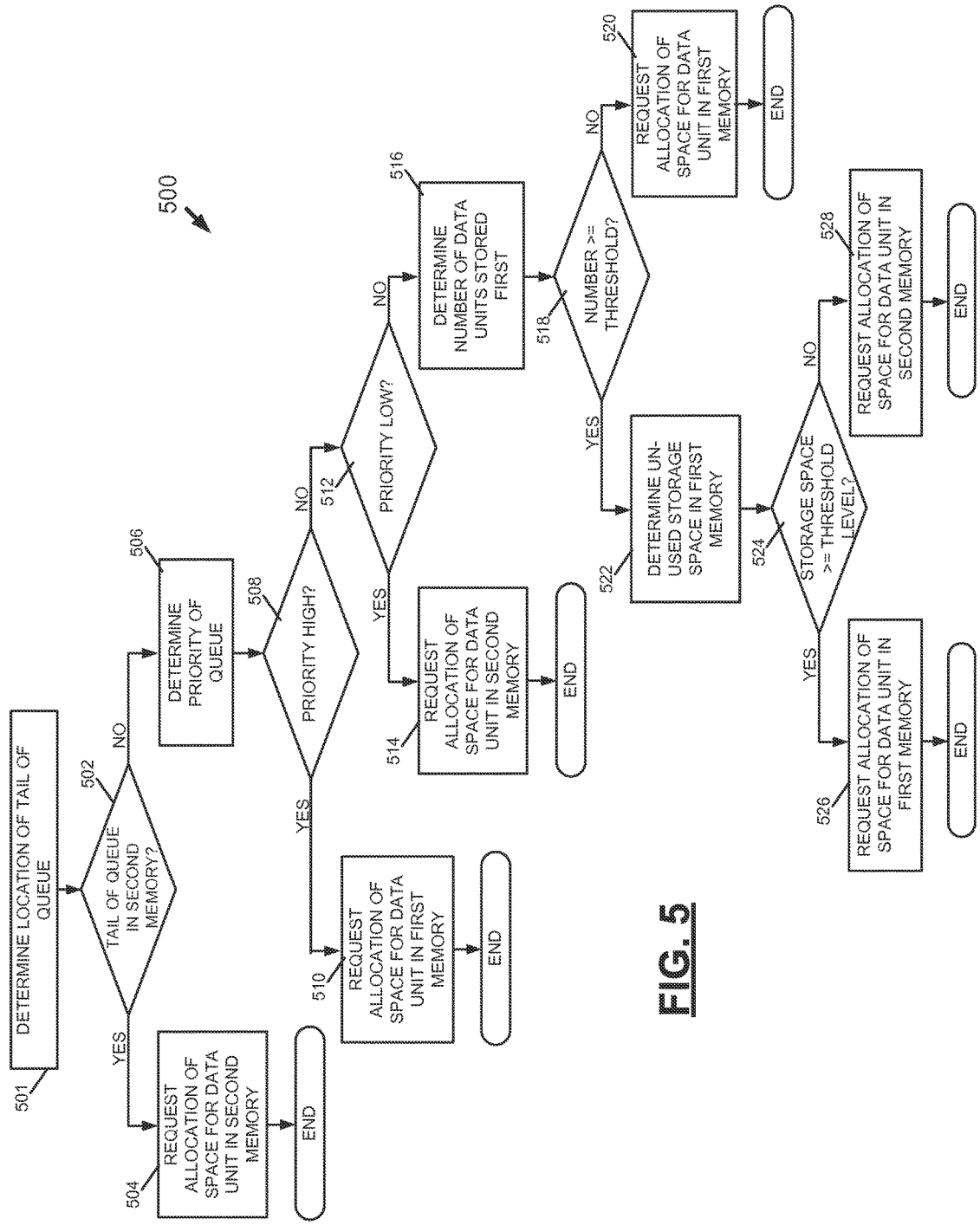
FIG. 5 is a flow diagram depicting steps of an example algorithm employed by the queue manager in generating a request to allocate storage space for a non-queued data unit, in accordance with an embodiment of the disclosure.

The queue manager 106 generates the request based on one or more factors. These factors include, for example, an amount of unused storage space in the first memory 110, a number of data units stored in the first memory 110 for the queue to which the non-queued data unit is to be added, and/or a priority of the queue to which the non-queued data unit is to be added. An example algorithm employed by the queue manager 106 in generating a request to allocate storage space for a non-queued data unit is illustrated in FIG. 5. This figure is a flow diagram 500 depicting steps of the example algorithm employed by the queue manager 106 in accordance with an embodiment of the disclosure. At 501, the queue manager 106 determines a location of a tail of a queue to which the non-queued data unit is to be appended. At 502, the queue manager 106 determines if the tail is located in the second memory 112. If the queue manager 106 determines that the tail is located in the second memory 112, at 504, the queue manager 106 generates a request that requests allocation of space for the non-queued data unit in the second memory 112.

If the queue manager 106 determines that the tail is not located in the second memory 112, at 506, the queue manager 106 determines a priority of the queue to which the non-queued data unit is to be appended. If the priority of the queue is determined at 508 to be high, at 510, the queue manager 106 generates a request that requests allocation of space for the non-queued data unit in the first memory 110. If the priority of the queue is determined at 508 to not be high, a determination is made at 512 as to whether the priority of the queue is low. If the priority of the queue is determined to be low, at 514, the queue manager 106 generates a request that requests allocation of space for the non-queued data unit in the second memory 112. If the priority of the queue is not determined to be low, at 516, the queue manager 106 determines a number of data units of the queue stored in the first memory 110.

At 518, the queue manager 106 determines if the number of data units stored in the first memory is greater than or equal to a queue size threshold. As explained above with reference to FIG. 3, the queue size threshold is a per-queue parameter or a parameter that applies to all queues of the packet processing system 100. Further, the queue size threshold for a queue is based on a priority of the queue or based on one or more other factors, in some embodiments. If the number of data units is determined at 518 to not be greater than or equal to the queue size threshold, at 520, the queue manager 106 generates a request that requests allocation of space for the non-queued data unit in the first memory 110. If the number of data units is determined at 518 to be greater than or equal to the queue size threshold, at 522, the queue manager 106 determines an amount of unused storage space in the first memory 110.

At 524, the queue manager 106 determines if the amount of unused storage space in the first memory 110 is greater than or equal to a threshold level. In an embodiment, the threshold level is equal to an amount of storage space required to store the non-queued data unit. If the amount of unused storage space is determined to be greater than or equal to the threshold level, at 526, the queue manager 106 generates a request that requests allocation of space for the non-queued data unit in the first memory 110. If the amount of unused storage space is determined to not be greater than or equal to the threshold level, at 528, the queue manager 106 generates a request that requests allocation of space for the non-queued data unit in the second memory 112.

The algorithm of FIG. 5 is modified in embodiments. For example, although the algorithm of FIG. 5 takes into consideration multiple factors in generating the request (e.g., priority of the queue, a number of data units stored in the first memory 110, an amount of unused storage space in the first memory 110, etc.), in other examples, the request is generated based on fewer factors. Thus, in an. example, the request is generated based on a priority of the queue to which the non-queued data unit is to he added and does not take into consideration the number of data units stored in the first memory 110 relative to the queue size threshold and the amount of unused storage space in the first memory 110, Similarly, in another example, the request is generated based on the number of data units stored in the first memory 110 relative to the queue size threshold and does not take into consideration the priority of the queue and the amount of unused storage space in the first memory 110. In another example, the request is generated based on the amount of unused storage space in the first memory 110 and does not take into consideration the priority of the queue and the number of data units stored in the first memory 110 relative to the queue size threshold. In other examples, the queue manager 106 generates the request based on some combination of the factors illustrated in FIG. 5.

Figure 6:
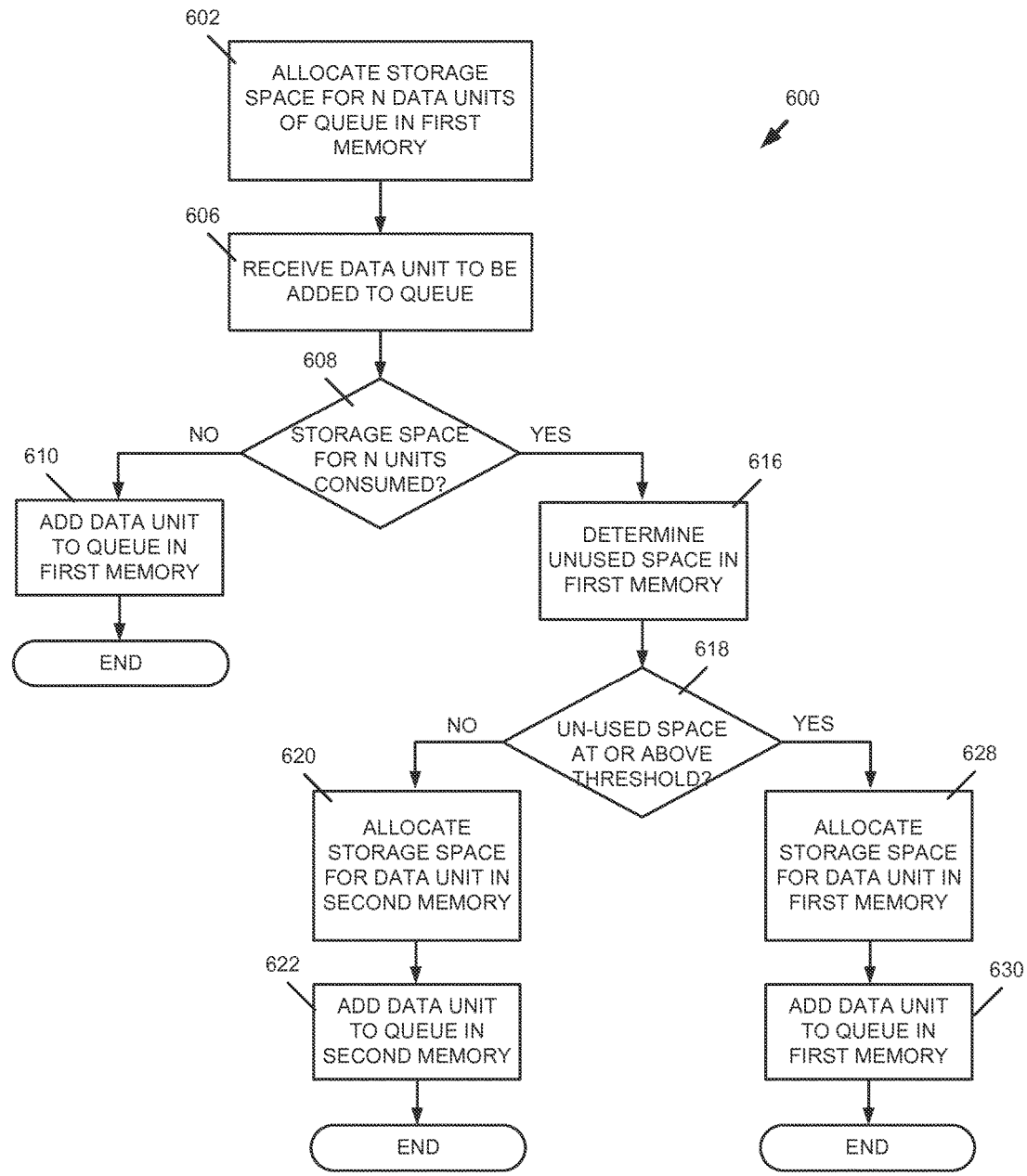
FIG. 6 is a flow diagram depicting steps of an example method for establishing and managing a queue in the packet processing system of FIGS. 1-4.

FIG. 6 is a flow diagram 600 depicting steps of an example method for establishing and managing a queue in the packet processing system 100 of FIGS. 1-4. As described in detail below, when the queue is initially established, space for N data units of the queue is allocated in the first memory 110, which comprises low latency memory (e.g., SRAM) that is disposed in relative close proximity to a processing unit, in an embodiment. When additional space is required for the queue, the additional space is allocated in the first memory 110 on an as-available basis or in the second memory 112. The second memory 112 comprises high latency memory (e.g., DRAM) that is disposed a relatively large distance from the processing unit, in an embodiment.

With reference to FIG. 6, when the queue is initially established, at 602, storage space for N data units of the queue is allocated in the first memory 110. In an example, the allocation of the storage space for the N data units is performed by the buffer manager 604 in response to a request received from the queue manager 106. In an example, the number "N" is equal to the queue size threshold discussed herein, which generally defines a maximum number of data units for a respective queue that are permitted to be stored on the first memory 110, At 606, the packet processing system 100 receives a non-queued data unit to be added to the queue. At 608, the queue manager 106 determines if the storage space for the N data units in the first memory 110 has been consumed. If the storage space for the N data units has not been consumed, at 610, the non-queued data unit is added to the queue in the first memory 110. The adding of the non-queued data unit to the queue in the first memory 110 is performed by the queue manager 106, in an embodiment, which writes the non-queued data unit to a portion of the storage space allocated for the N data units.

If the storage space for the N data units has been consumed, at 616, the queue manager 106 determines the amount of unused storage space in the first memory 110. At 618, the queue manager 106 determines if the amount of unused storage space is greater than or equal to a threshold. In an embodiment, the threshold is equal to an amount of storage space required to store the non-queued data unit. If the amount of unused storage space is determined at 618 to not be greater than or equal to the threshold, at 620, storage space for the non-queued data unit is allocated in the second memory 112. The allocating of the storage space in the second memory 112 is performed by the buffer manager 604 in response to a request from the queue manager 106. At 622, the queue manager 106 adds the non-queued data unit to the queue by writing the non-queued data unit to the storage space allocated in the second memory 112.

If the amount of unused storage space is determined at 618 to be greater than or equal to the threshold, at 628, storage space for the non-queued data unit is allocated in the first memory 110. The allocating of the storage space in the first memory 110 is performed by the buffer manager 604 in response to a request from the queue manager 106. At 630, the queue manager 106 adds the non-queued data unit to the queue by writing the non-queued data unit to the storage space allocated in the first memory 110.

Figure 7:
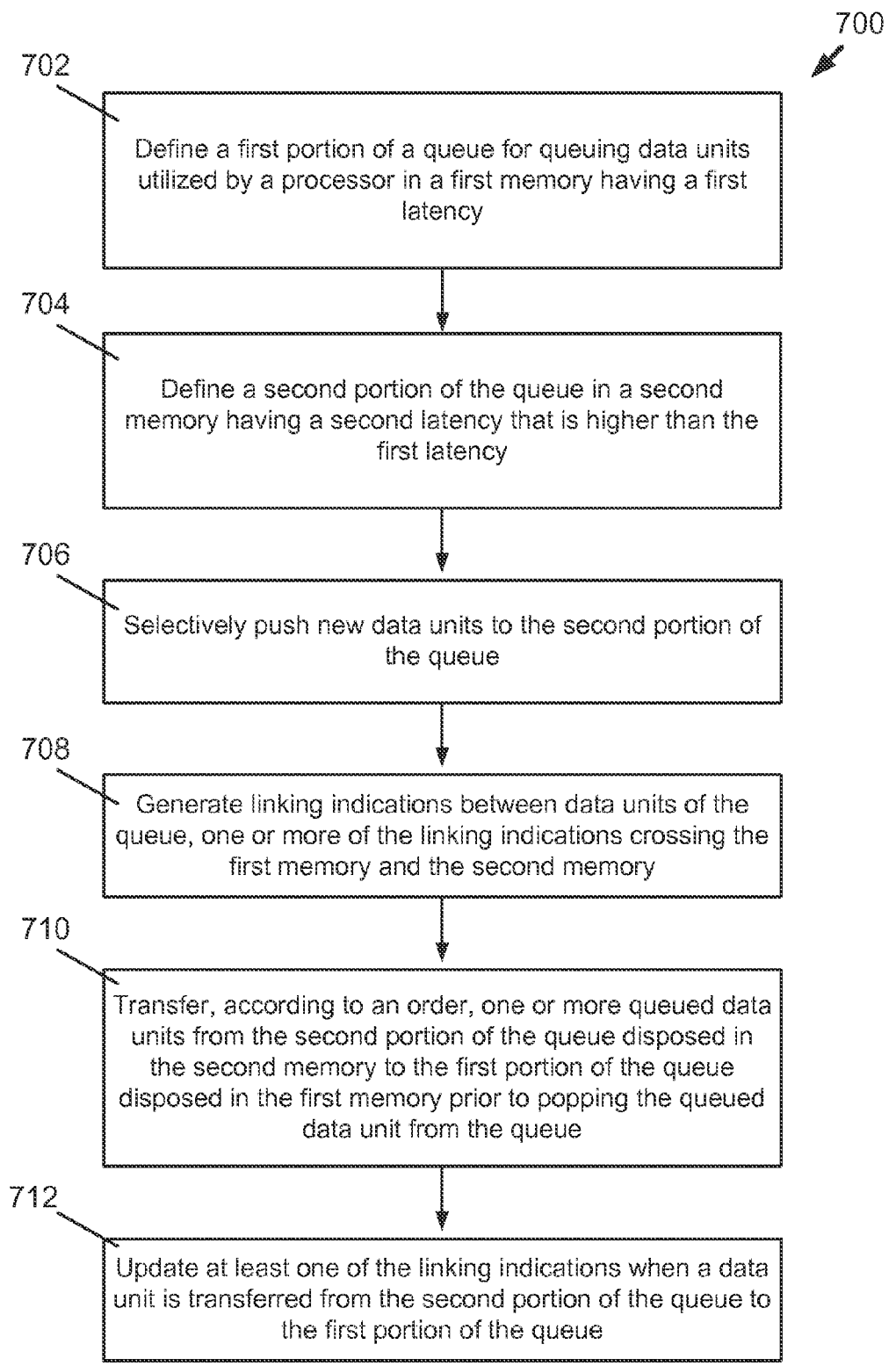
FIG. 7 is a flow diagram depicting steps of a method in accordance with an embodiment of the disclosure.

FIG. 7 is a flow diagram 700 depicting steps of a method for processing data units. At 702, a first portion of a queue for queuing data units utilized by a processor is defined in a first memory having a first latency. At 704, a second portion of the queue is defined in a second memory, different from the first memory and having a second latency that is higher than the first latency. At 706, new data units are selectively pushed to the second portion of the queue. At 708, linking indications are generated between data units of the queue, where one or more of the linking indications crosses the first memory and the second memory. At 710, one or more queued data units are transferred, according to an order, from the second portion of the queue disposed in the second memory to the first portion of the queue disposed in the first memory prior to popping the queued data unit from the queue. At 712, at least one of the linking indications is updated when a data unit is transferred from the second portion of the queue to the first portion of the queue.

This application uses examples to illustrate the invention. The patentable scope of the invention may include other examples.

What is claimed is:

1. A packet processing system, comprising:
   a processor for processing units of data traffic received from a network;
   a first memory composed of a first type of memory cells and disposed in proximity to the processor;
   a second memory composed of a second type of memory cells that is different from the first type and being disposed further away from the processor than the first memory, wherein a head portion of a queue for queuing data units utilized by the processor is disposed in the first memory, and a tail portion of the queue is disposed in the second memory, wherein the second memory has a greater memory space than the first memory and the second memory is configured to receive bursts of high activity data traffic without dropping units of data traffic, the high activity data traffic being periodically received from the network at a data rate that is higher than a sustained data rate of the data traffic, the sustained data rate being indicative of an average rate at which data units are received over time; and
   a queue manager configured to:
   (i) manage the queue using a linked list, the linked list comprising linking indications between data units of the queue that are maintained across the first and second memories,
   (ii) selectively push new data units to the tail portion of the queue at a burst data rate, at least some of the new data units from data traffic bursts of high-traffic activity, such that newer data units of the queue that are received during high-traffic activity are stored in the second memory at a rate that is higher than the sustained data rate, and generate a linking indication linking a new data unit to an earlier-received data unit that is physically located either in the head or tail portion of the queue, and
   (iii) transfer, according to an order, a queued data unit from the tail portion of the queue disposed in the second memory to the head portion of the queue disposed in the first memory, without overloading the first memory, prior to popping the queued data unit from the head portion of the queue, such that older data units of the queue are stored in the first memory, and to update the linking indication for the queued data unit that is transferred from the tail portion to the head portion.

2. The packet processing system of claim 1, wherein the queue manager is configured to (i) generate linking indications between data units of the head and tail portions of the queue, each of the linking indications indicating at least an address of a next data unit in the head or tail portion of the queue, wherein one or more of the linking indications crosses the first memory and the second memory, and (ii) update at least one of the linking indications when a data unit is transferred from the tail portion of the queue disposed in the second memory to the head portion of the queue disposed in the first memory, the updating indicating a new address of the data unit after the data unit is transferred.

3. The packet processing system of claim 1, wherein the first memory is disposed in relative close proximity to one or more processor components of the processor that is configured to process data units stored in the head and tail portions of the queue, and wherein the queue manager is configured to utilize a threshold value to indicate a predetermined number of data units in the first memory.

4. The packet processing system of claim 1,
wherein the first memory comprises static random-access memory (SRAM), and
wherein the second memory comprises dynamic random-access memory (DRAM).

5. The packet processing system of claim 1,
wherein the processor is implemented as an integrated circuit disposed at least on a first chip;
wherein the first memory is disposed on at least the first chip; and
wherein the second memory is disposed on a second integrated circuit separate from and coupled to the at least first chip.

6. The packet processing system of claim 1, comprising:
a buffer manager configured to (i) receive a request from the queue manager to allocate storage space in one of the first memory or the second memory for a non-queued data unit, and (ii) allocate the storage space based on the request, wherein the queue manager is configured to determine an amount of unused storage space in the first memory and to generate the request based on the amount.

7. The data packet processing system of claim 6, wherein the queue manager is configured to determine whether the amount of unused storage space is greater than or equal to a predefined level and to generate the request based on the determination, the request requesting the storage space be allocated in the first memory based on the amount being greater than or equal to the predefined level, and the request requesting the storage space be allocated in the second memory based on the amount being below the predefined level, wherein the queue manager is further configured to add the non-queued data unit to the head or tail portion of the queue in the allocated storage space.

8. The packet processing system of claim 7, wherein the predefined level is equal to an amount of storage space required to store the non-queued data unit.

9. The data packet processing system of claim 1, comprising:
a buffer manager configured to (i) receive a request from the queue manager to allocate storage space in one of the first memory or the second memory for a non-queued data unit, and (ii) allocate the storage space based on the request, wherein the queue manager is configured to determine a number of data units stored in the head portion of the queue and to generate the request based on the number.

10. The data packet processing system of claim 9, wherein the queue manager is configured to determine whether the number is greater than or equal to a queue size threshold and to generate the request based on the determination, the request requesting that storage space be allocated in the second memory based on the number being greater than or equal to the queue size threshold, and the request requesting that storage space be allocated in the first memory based on the number being less than the queue size threshold, and wherein the queue manager is further configured to add the non-queued data unit to the head or tail portion of the queue in the allocated storage space.

11. The packet processing system of claim 10, wherein the queue size threshold is based on a priority of a data flow associated with the head or tail portion of the queue, the data flow comprising a plurality of data units originating from a particular network or device that are stored in the head or tail portions of the queue, wherein the priority of the data flow is based on a sensitivity to latency of the data flow or a bandwidth of the data flow.

12. The data packet processing system of claim 1 comprising; a buffer manager configured to (i) receive a request from the queue manager to allocate storage space in one of the first memory or the second memory for a non-queued data unit, and (ii) allocate the storage space based on the request, wherein the queue manager is configured to determine a priority of the queue and to generate the request based on the priority, wherein the request requests that storage space be allocated in the first memory based on the priority being high, wherein the request requests the storage space be allocated in the second memory based on the priority being low, and wherein the queue manager is further configured to add the non-queued data unit to the head or tail portion of the queue in the allocated storage space.

13. The packet processing system of claim 1 comprising:
a packet scheduler configured to transmit a request to the queue manager, wherein the queue manager effectuates the popping of the queued data unit from the head portion of the queue in response to the request, the queue manager transferring the queued data unit from the second memory to the first memory prior to receiving the request.

14. A method for processing data units, the method comprising:
defining a head portion of a queue for queuing data units utilized by a processor in a first memory composed of a first type of memory cells and disposed in proximity to the processor;
defining a tail portion of the queue in a second memory composed of a second type of memory cells that is different from the first type and disposed further away from the processor than the first memory, wherein the second memory has a larger memory space than the first memory, and wherein the second memory is configured to receive bursts of high activity data traffic without dropping units of data traffic, the high activity data traffic being periodically received from a network at a data rate that is higher than a sustained data rate of the data traffic, the sustained data rate being indicative of an average rate at which data units are received over time;

managing the queue using a linked list, the linked list comprising linking indications between data units of the queue that are maintained across the first and second memories;

selectively pushing new data units to the tail portion of the queue at a burst data rate, at least some of the new data units from data traffic bursts of high-traffic activity, such that newer data units of the queue are stored in the second memory;

generating a linking indication linking a new data unit to an earlier-received data unit in the head or tail portion of the queue;

transferring, according to an order, a queued data unit from the tail portion of the queue disposed in the second memory to the tail portion of the queue disposed in the first memory, without overloading the first memory, prior to popping the queued data unit from the tail portion of the queue, such that older data units of the queue are stored in the first memory; and updating the linking indication for the queued data unit that is transferred from the tail portion to the head portion.

15. The method of claim 14, wherein each of the linking indications identifies at least a subsequent data unit in the head or tail portion of the queue and an address for the subsequent data unit in one of the first memory or the second memory, the updating of the at least one of the linking indications comprising: indicating a new address of the data unit after the data unit is transferred from the tail portion of the queue disposed in the second memory to the head portion of the queue disposed in the First memory.

16. The method of claim 14, wherein the selective pushing of the new data units to the tail portion of the queue comprises: determining an amount of unused storage space in the first memory; pushing a new data unit to the head portion of the queue disposed in the first memory based on a determination that the amount of unused storage space is greater than or equal to a threshold value; and pushing the new data unit to the tail portion of the queue disposed in the second memory based on a determination that the amount of unused storage space is less than the threshold value.

17. The method of claim 14, wherein the selective pushing of the new data units to the tail portion of the queue comprises: determining a number of data units stored in the head portion of the queue disposed in the first memory; pushing a new data unit to the tail portion of the queue disposed in the second memory based on a determination that the number of data units is greater than or equal to a queue sire threshold; and pushing the new data unit to the head portion of the queue disposed in the first memory based on a determination that the number of data units is less than the queue size threshold.

18. The packet processing system of claim 1, wherein the queue manager is configured to allocate storage space for a non-queued data unit by determining the number of data units stored in the tail portion of the queue disposed in the first memory;

comparing the number of data units to the threshold value;

based on a determination that the number of data units is less than the threshold value, requesting an allocation of space for the non-queued data unit in the first memory;

based on a determination that the number of data units is greater than or equal to the threshold value, determining an amount of unused storage space in the first memory;

comparing the amount of unused storage space to a predefined level;

based on a determination that the amount of unused storage space is less than the predefined level, requesting an allocation of space for the non-queued data unit in the second memory; and based on a determination that the amount of unused storage space is greater than or equal to the predefined level, requesting an allocation of space for the non-queued data unit in the first memory.

19. The method of claim 14, further comprising allocating storage space for a non-queued data unit by determining the number of data units stored in the head portion of the queue disposed in the first memory;

comparing the number of data units to the threshold value;

based on a determination that the number of data units is less than the threshold value, requesting an allocation of space for the non-queued data unit in the first memory;

based on a determination that the number of data units is greater than or equal to the threshold value, determining an amount of unused storage space in the first memory;

comparing the amount of unused storage space to a predefined level;

based on a determination that the amount of unused storage space is less than the predefined level, requesting an allocation of space for the non-queued data unit in the second memory; and based on a determination that the amount of unused storage space is greater than or equal to the predefined level, requesting an allocation of space for the non-queued data unit in the first memory.

20. The packet processing system of claim 1, wherein the queue manager is further configured to:

(iv) in response to a request received from a requestor outside the packet processing system, pop the queued data unit from the head portion for transmission to the requestor at an output data rate that is independent of the burst data rate, wherein the memory space of the second memory for storing new data units is expandable when the burst data rate is greater than the output data rate without expanding the memory space of the first memory.

21. The method of claim 14, further comprising:

in response to a request received from a requestor outside the packet processing system, popping the queued data unit from the head portion for transmission to the requestor at an output data rate that is independent of the burst data rate, wherein the memory space of the second memory for storing new data units is expandable when the burst data rate is greater than the output data rate without expanding the memory space of the first memory.

* * * * *